United States Patent [19]

Divine

[11] 4,280,477
[45] Jul. 28, 1981

[54] COMBINATION FENCE AND SOLAR HEATER FOR SWIMMING POOLS

[76] Inventor: David L. Divine, 10244 Blue Water Hwy., Lowell, Mich. 49331

[21] Appl. No.: 114,808

[22] Filed: Jan. 24, 1980

[51] Int. Cl.³ .................................................. F24J 3/02
[52] U.S. Cl. ..................................... 126/416; 126/432; 126/436; 4/493
[58] Field of Search ............... 126/415, 416, 418, 432, 126/444, 436, 901; 4/493; 137/494; 165/49, 104 S, 179, 181; 52/168; 256/1, 23, 73, 24, 31, 22

[56] References Cited

U.S. PATENT DOCUMENTS

| | | | |
|---|---|---|---|
| 3,868,945 | 3/1975 | Konopka et al. | 126/271 |
| 3,910,490 | 10/1975 | Saypalia, Jr. | 126/416 |
| 3,945,059 | 3/1976 | Allocco, Jr. | 4/172 |
| 4,004,380 | 1/1977 | Kwake | 126/416 X |
| 4,052,975 | 10/1977 | Ceideburg | 126/418 X |
| 4,164,933 | 8/1979 | Alosi | 126/447 |
| 4,169,460 | 10/1979 | Popovich et al. | 165/104 S X |
| 4,211,213 | 7/1980 | Nissen et al. | 126/444 |

FOREIGN PATENT DOCUMENTS

| | | | |
|---|---|---|---|
| 2539921 | 3/1977 | Fed. Rep. of Germany | 126/416 |
| 2820772 | 11/1979 | Fed. Rep. of Germany | 126/415 |
| 2115242 | 7/1972 | France | 165/179 |
| 52-23738 | 2/1977 | Japan | 126/448 |

Primary Examiner—James C. Yeung
Assistant Examiner—Randall L. Green
Attorney, Agent, or Firm—Price, Heneveld, Huizenga & Cooper

[57] ABSTRACT

A combination fence and solar heater for swimming pools comprises a fence shaped for extending about the periphery of the pool to restrict ingress and egress therefrom. A tubular heat exchanger is formed in at least one section of the fence, includes an exterior surface adapted to absorb solar energy, and communicates with the water in the swimming pool. The number of heat exchanger fence sections can be varied in accordance with the climate in which the pool is located. A pump flows the water in the swimming pool through the heat exchanger fence sections during daylight hours, thereby simultaneously heating the water in the pool, and providing an attractive and protective safety barrier about the swimming pool.

11 Claims, 4 Drawing Figures

U.S. Patent
Jul. 28, 1981
4,280,477
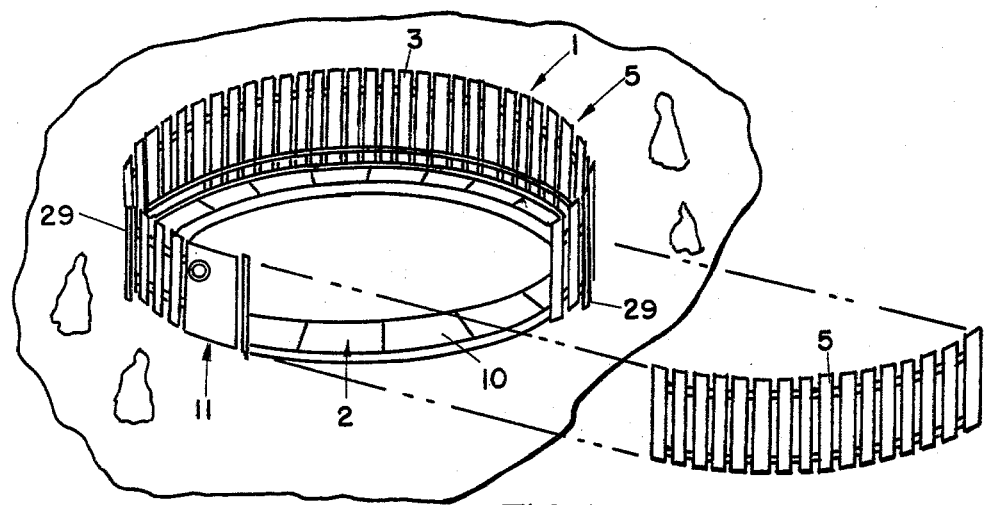
FIG 1
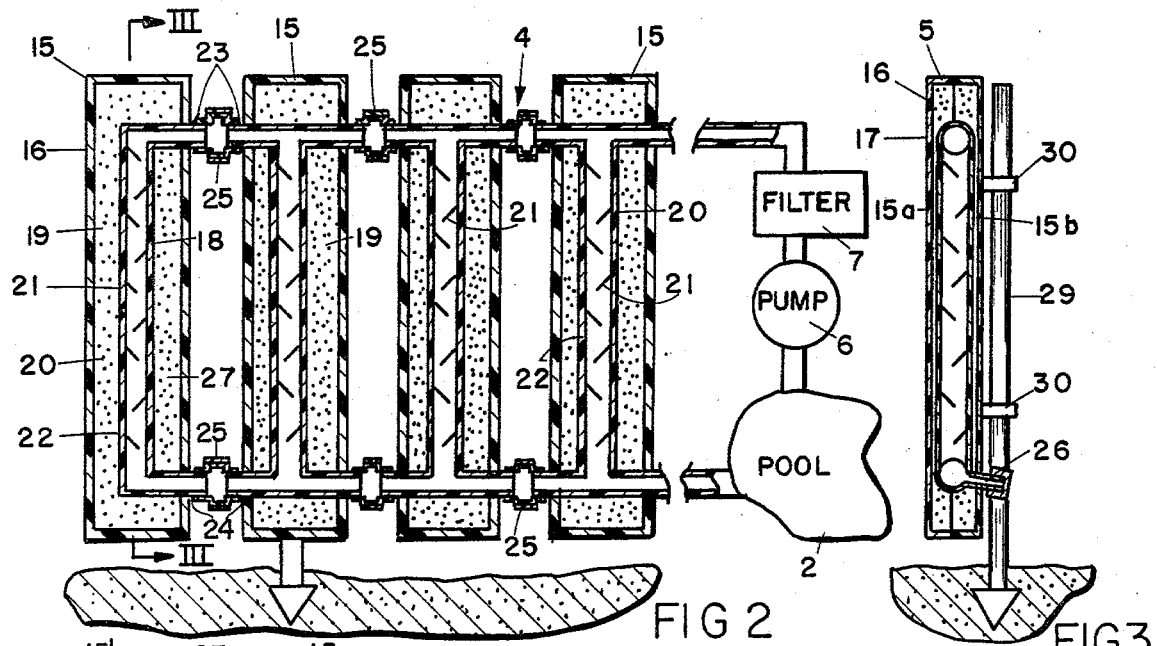
FIG 2
FIG 3
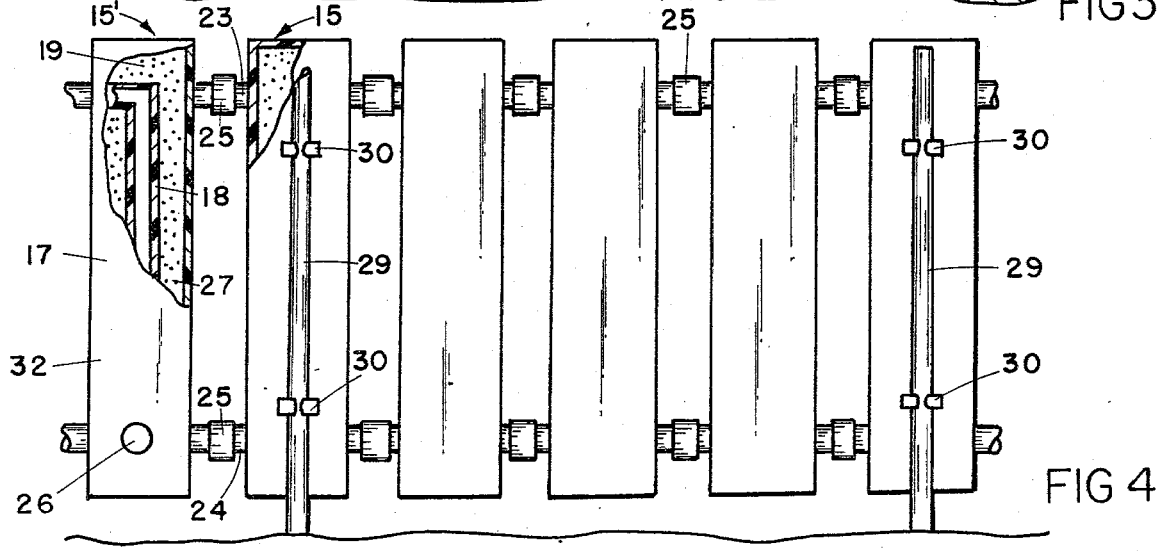
FIG 4

COMBINATION FENCE AND SOLAR HEATER FOR SWIMMING POOLS

BACKGROUND OF THE INVENTION

This invention relates to swimming pools, and in particular to a combination fence and solar heater therefor.

As a result of the serious hazards which are associated with swimming pools, a fence or similar barrier is typically installed about the periphery of the pool to control ingress and egress therefrom, and principally to keep out uninvited personnel. To be effective, the fence must form a fairly tight boundary about the pool, with sufficient height to discourage unauthorized entry, and with openings small enough to render the structure substantially impervious, particularly to small children. Such fences can be raised to a height sufficient to form a privacy barrier about the pool, and preferably have an attractive appearance.

Another problem associated with the operation of a swimming pool relates to the cost and difficulty of maintaining the temperature of the water in the pool at a comfortable level. Conventional pool heaters, particularly those used with smaller, private pools, are typically quite inefficient, and also require a fairly large area of deck space, thereby obstructing free movement about the pool.

SUMMARY OF THE INVENTION

The principal objects of the present invention are: to provide a combination fence and solar heater for swimming pools; to provide such a combination fence and heater which does not obstruct the pool deck, and efficiently heats the pool water at a very low cost; to provide such a combination fence and heater wherein the fence is formed in a plurality of sections, such that the number of heat exchanger sections can be varied in accordance with the climate in which the pool is located; to provide such a combination force and heater including a plurality of interconnected pickets, through which heat exchanging cavities are provided and which are easily interconnectable; to provide such a combination fence and heater which has an attractive decorative appearance, and can be mounted in a manner to best take advantage of the prevailing sunlight for a particular location; to provide such a combination fence and heater wherein the fence pickets have a darkly colored outer surface which is adapted to readily absorb solar energy; to provide such a combination fence and heater wherein the pickets include a heat retaining material disposed between the picket cavity and the outer surface of the picket, so as to form heat sink therebetween; and to provide such a combination fence and heater which is economical in manufacture, efficient in use, has a long life, and is particularly well adapted for the proposed use.

These and many other important advantages of the invention will be further understood and appreciated by those skilled in the art by reference to the following written specification, claims, and appended drawings.

BRIEF DESCRIPTION OF THE DRAWINGS

FIG. 1 is a perspective view of a combination fence and solar heater embodying the present invention, shown installed about a swimming pool, with a section of the fence exploded away for illustrative purposes.

FIG. 2 is a partially schematic vertical cross-sectional view of the combination fence and solar heater, diagrammatically shown connected with a pool pump, filter, and a swimming pool.

FIG. 3 is a vertical cross-sectional view of the combination fence and solar heater, taken along the line III—III, FIG. 2.

FIG. 4 is a front plan view of the combination fence and solar heater, with portions thereof broken away to reveal internal construction.

DETAILED DESCRIPTION OF THE PREFERRED EMBODIMENTS

For purposes of description herein, the terms "upper," "lower," "right," "left," "rear," "front," "vertical," "horizontal," and derivatives thereof shall relate to the invention as oriented in FIG. 2. However, it is to be understood that the invention may assume various alternative orientations, except where expressly specified to the contrary.

The reference numeral 1 (FIG. 1) generally designates a combination fence and solar heater embodying the present invention, which is particularly adapted for use in conjunction with a swimming pool 2. The device 1 comprises a fence 3 shaped for extending about the periphery of the swimming pool 2 to restrict ingress and egress therefrom. The tubular heat exchanger 4 (FIG. 2) is formed in at least a portion of the fence 3, and includes an exterior surface adapted to absorb solar energy, and is communicated with the water in the swimming pool. The fence 3 is preferably formed in sections 5 (FIG. 1), such that the length of the heat exchanger can be varied in accordance with the climate in which the pool is located. A pump 6 (FIG. 2) flows the water in the swimming pool 2 through the heat exchanger 4 during daylight hours, thereby simultaneously heating the water in the pool, and providing an attractive and protective barrier about the swimming pool.

In the embodiment illustrated in FIG. 1, the combination fence and solar heater 1 is positioned about the periphery of the deck portion 10 of swimming pool 2. In this manner, the device 1 does not obstruct or hinder movement about the edge of the pool. It is to be understood that the device 1 may be positioned about the swimming pool 2 in a wide variety of different configurations, however, it is preferred that the fence be disposed as close as practicable to the pool to increase operating efficiency. The fence 3 forms a barrier around the pool 2 which is substantially impervious to unauthorized persons, and a gate 11 is provided to control ingress and egress from the enclosed pool area.

As best shown in FIGS. 2 and 3, the illustrated device 1 comprises a picket type of fence, wherein the tubular heat exchanger 4 is formed in selected pickets 15. However, it is to be understood that the fence 3 may assume virtually any desired shape consistent with the inventive concept disclosed herein, including horizontal fence designs, such as split rail, and the like. Each of the illustrated pickets 15 has a substantially rectangularly shaped body with the longitudinal axis thereof disposed substantially vertically. The picket 15 includes an outer shell 16 with an exterior surface 17 which is particularly adapted to absorb heat energy from the sunlight which impinges upon it, and may be constructed of a plastic having a dark coloration, such as red, to simulate a redwood fence. The heat exchanger 4 is formed by a tubular member 18 which extends longitudinally through the central portion of each of the pickets 15 and defines a cavity therein. The tubular member 18 may be constructed as a separate piece and connected with outer shell 16, or it may be formed integrally in the picket outer shell as illustrated in FIGS. 2 and 3. The pickets 15 are preferably molded from a synthetic resin material in two halves which mate along a vertical plane, and form the front and back 15a and 15b respectively of the picket 15. The front and rear picket halves 15a and 15b each include one half of the heat exchanger cavity therein, and the picket halves are securely interconnected by adhesive or other suitable means. A space 19 is formed between outer shell 16 and tubular member 18, thereby decreasing the material cost and weight of the picket 15. A synthetic resin material, such as that known in the trade as ABS, is believed to be suitable for molding the picket halves 15a and 15b. A simulated redwood color and surface texture is preferred.

The illustrated tubular member 18 includes a vertical tube 20 with a plurality of alternately staggered fins 21 formed in each picket half 15a and 15b, which project inwardly from the side walls 22 of the vertical tube for directing the water along a tortuous path through the picket for improved heat transfer efficiency. It is to understood that each picket 15 may be provided with more than one vertical tube 20, depending upon the width of the picket and the heat transfer required. On each of the pickets 15 which are adapted for positioning intermediate the extreme ends of a fence section 5, two pairs of horizontal tubes 23 and 24 extend laterally from the top and bottom respectively of the vertical tube 20, and communicate therewith for flowing the pool water therethrough. Both the vertical tube 20 and horizontal tubes 23 and 24 are shown in FIGS. 2 and 3 integrally molded in each picket half. The horizontal tubes 23 and 24 each have a union 25 connected with the free end thereof, which is shaped to mate with the union of an adjacently disposed picket, so as to mechanically interconnect the two pickets, as well as communicate the heat exchanger cavities thereof in a parallel fashion. Preferably, the unions 25 telescopically mate with the ends of the horizontal tubes 23 and 24 and are connected therewith by a watertight fastener, such as adhesive or the like. The unions also include mating threaded ends which are arranged such that the pickets can be interconnected without regard to the front-back and/or top-bottom orientation of the picket 15.

Those pickets which are adapted for placement at the end of the fence section 5 only include one top and one bottom tube 23 and 24, both of which extend from the same side of the picket 15, and are adapted to mate with the horizontal tubes of an adjacent intermediate picket. Each picket 15 may be provided with a drain spout and closure assembly 26 (FIG. 3) disposed at the lowermost portion of the tubular member 18 to facilitate draining the picket.

The picket 15 is capable of transmitting heat absorbed by the exterior surface 17 thereof to and through the tubular member 4. The body of the illustrated picket 15 is hollow, with space 19 formed between the outer shell 16 and the tubular member 18. The air trapped in the space 19 will serve to transfer the solar heat through the picket body. For improved heat transfer, space 19 is preferably filled with a conductive substance, such as water or the like. In this example, space 19 is filled with a heat retaining material 27, for example, calcium chloride, to form a heat sink, such that the pool water can continue to be heated even if the sunlight impinging on the fence is temporarily interrupted.

The fence 3 is preferably shaped in a plurality of interconnected sections 5, such that the length of the heat exchanger 4 can be selected in accordance with the climate in which the swimming pool is located. Hence, in rather warm climates, the user may require only one or two sections of fence having a heat exchanger 4 therein, with the other sections being a solid fence. In cooler climates, the user may require that all of the fence sections include a heat exchanger so as to maximize heating ability.

The pickets 15 which do not include a heat exchanger 4 are preferably otherwise identical in shape and color to the heat exchanger pickets so as to form an attractive fence. As shown in FIG. 4, picket 15' (with heat exchanger), and picket 15" (without heat exchanger) have approximately the same width, height, thickness, color and surface finish. Also, picket 15" includes horizontal tubes 23 and 24 with unions 25 which mate with corresponding parts of the picket 15'. Picket 15" may have a solid body construction, and in the illustrated example has the outer shell 16 and hollow interior construction of the picket 15'. A side wall thickness in the nature of 0.150 inches has proven satisfactory for pickets having a width of 4-6 inches, a thickness of approximately 1 inch, and a length of about 6 feet. The length and width of the heat transfer pickets can be varied in accordance with heat transfer requirements.

As best illustrated in FIGS. 3 and 4, the fence sections 5 are supported by posts 29 which extend about the periphery of the fence, and have the lower ends thereof anchored in the ground. The posts 29 may be located on either the outside or the inside of the fence, depending upon the particular installation circumstances. In any event, it is preferred that the pickets 15 disposed at the end of each fence section 5 include a pair of clips 30 which are adapted for connection with the upper portion of the posts 29, such that the fence sections are supported thereon. The illustrated clips 30 are of a split ring design molded integrally with the pocket outer shell 16. A number of pickets 15 with clips 30 thereon are selected in accordance with the size and weight of the particular fence section 5 to insure secure support.

In use, the user first must select an appropriate number of heat exchanger pickets 15' and fence sections 5 in accordance with the climate in which the pool is located. After this has been accomplished, each of the heat exchanger pickets 15' is assembled by coupling the unions 25. When the pickets 15' are interconnected to form a fence section, the horizontal tubes 23 and 24 form upper and lower manifolds or headers which communicate each of the picket cavities in a parallel relationship. The heat exchanger fence sections 5 are then positioned about the pool in the desired manner. Preferably, the flat side surfaces 32 of the pickets are oriented in a manner which is perpendicular to the direction in which the predominate sunlight is received in that area of the country. The heat exchanger fence sections 5 are then mounted on posts 29, which are spaced apart along the perimeter of the fence. The non-heat exchanger pickets 15" and fence sections are then constructed about the pool and are connected with the heat exchanger sections in an arrangement to enclose the pool so as to restrict ingress and egress therefrom. The gate 11 is typically placed at a convenient location so as to admit authorized personnel.

The heat exchanger fence sections 5 are then connected with the pool pump 6 and filter 7. In the schematic illustration shown in FIG. 2, water is pumped from the pool 2 through pump 6 and thence through filter 7 into the upper tubes 23 and upper header. The water flows along the upper header, and then downwardly through the picket cavities, wherein solar heat received from the sunlight is imparted to the water through conduction. The fins 21 force the water to flow in a tortuous path through the picket, so as to expose the water to more surface area of heat exchanger, and to increase the temperature of the water. The water then flows through the lower tubes 24 and lower header back into the swimming pool 2. In this manner, the device 1 simultaneously heats the water in the swimming pool, cools the heat exchanger fence sections, and provides a protective safety barrier around the pool.

In the foregoing description, it will be readily appreciated by those skilled in the art that many modifications may be made to the invention without departing from the concepts disclosed herein. Such modifications are to be considered as included in the following claims unless these claims by their language expressly state otherwise.

The embodiments of the invention in which an exclusive property or privilege is claimed are defined as follows:

1. A combination fence and solar heater for swimming pools, comprising:

a fence shaped for extending about the periphery of a swimming pool area and restricting ingress and egress therefrom;

said fence comprising a plurality of interconnected pickets, and having heat exchanger means formed in at least a portion thereof; said heat exchanger means comprising a number of said pickets preselected in accordance with the climate in which said combination fence and solar heater is installed, and being arranged in said fence to face the direction of predominant sunlight; said preselected pickets having an exterior surface, a water carrying passageway extending therethrough with an inlet and an outlet communicating with the water in the swimming pool, and means for absorbing heat energy from sunlight impinging on the exterior surface of said selected pickets and conducting said heat to said water carrying passageway;

means for flowing the water in said swimming pool through said preselected pickets during daylight hours, whereby solar energy absorbed by the exposed exterior surface portion of the preselected pickets is transferred to the water flowing therethrough, thereby simultaneously heating the water in the swimming pool, and providing a protective safety barrier about the swimming pool.

2. A combination fence and solar heater as set forth in claim 1, wherein each of said preselected pickets comprises:

an elongate body having a longitudinally extending cavity therein with two pairs of tubular members extending laterally from each end of the picket cavity and communicating therewith for flowing water therethrough; and wherein said body includes an outer surface with a coloration adapted to absorb solar energy, and a conductive medial portion adapted to transmit heat from the exterior surface of the body to the body cavity;

said tubular members each having a union connected with the free end thereof shaped to mate with the union of an adjacently disposed picket for mechanically interconnecting adjacent pickets to form a rigid fence section, and communicating the body cavity of each of said preselected pickets in a parallel arrangement to form said passageway.

3. A picket as set forth in claim 2, wherein:

each union comprises a threaded coupling for easily varying the length of said fence heating portion.

4. A picket as set forth in claim 3, wherein:

said fence is supported by a plurality of posts spaced apart about the periphery of said fence, and having the lower ends thereof anchored in the ground.

5. A combination fence and solar heater as set forth in claim 4, wherein:

each picket cavity includes a plurality of alternately staggered fins projecting inwardly from the side wall thereof for directing the water along a tortuous path through said picket.

6. A combination fence and solar heater as set forth in claim 5, wherein:

said picket outer surface has a dark coloration adapted to readily absorb solar energy.

7. A combination fence and solar heater as set forth in claim 6, wherein:

said pickets each include a heat retaining material disposed between said picket cavity and said outer surface, for forming a heat sink therebetween.

8. A combination fence and solar heater as set forth in claim 7, wherein:

said heat retaining material comprises calcium chloride.

9. A picket for a combination swimming pool fence and solar heater, comprising:

an elongate body having a longitudinally extending cavity therein with two pairs of tubular members extending laterally from each end of the picket cavity and communicating therewith for flowing water therethrough; and wherein said body includes an exterior surface with a coloration adapted to absorb solar energy, and a conductive medial portion adapted to transmit heat from the exterior surface of the body to the body cavity;

said tubular members each having a union connected with the free end thereof shaped to mate with the union of an adjacently disposed picket for mechanically interconnecting adjacent pickets to form a rigid fence section for positioning about a swimming pool to restrict ingress and egress therefrom, and communicating the body cavity of said picket with the water in the swimming pool, whereby the water in the pool is flowed through said picket, thereby simultaneously heating the water in the swimming pool, and forming a portion of a protective safety barrier about the swimming pool.

10. A picket as set forth in claim 9, wherein:

said body cavity includes a plurality of alternately staggered fins projecting inwardly from a side wall thereof for directing the water along a tortuous path through said picket.

11. A picket as set forth in claim 9, wherein:

said conductive medial portion is constructed of calcium chloride.

* * * * *

UNITED STATES PATENT AND TRADEMARK OFFICE
CERTIFICATE OF CORRECTION

PATENT NO. : 4,280,477
DATED : July 28, 1981
INVENTOR(S) : DAVID L. DIVINE

It is certified that error appears in the above—identified patent and that said Letters Patent is hereby corrected as shown below:

Column 1, line 41:

"force" should be --fence--;

Column 1, line 54:

Insert --a-- before "heat sink";

Column 3, lines 24-25:

Insert --be-- before "understood".

Signed and Sealed this

Twentieth Day of October 1981

[SEAL]

Attest:

GERALD J. MOSSINGHOFF

Attesting Officer

Commissioner of Patents and Trademarks